3,058,990
HALOALLYLTHIADIAZOLES

Marion W. Harman, Dunbar, W. Va., assignor to Monsanto Chemical Company, St. Louis, Mo., a corporation of Delaware
No Drawing. Filed Jan. 19, 1961, Ser. No. 83,631
8 Claims. (Cl. 260—302)

The present invention relates to new compositions of matter. More particularly it relates to haloallylthiadiazoles and their preparation.

The compounds of this invention possess the structure

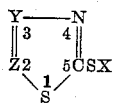

where X represents haloalkenyl, Y and Z represent CSX or N, one being CSX and one being N, wherein X has the same meaning as above. The following are representative examples:

2,5-bis(3-chloroallylthio)-1,3,4-thiadiazole
2,5-bis(2-chloroallylthio)-1,3,4-thiadiazole
3,5-bis(3-chloroallylthio)-1,2,4-thiadiazole
3,5-bis(2-chloroallylthio)-1,2,4-thiadiazole
2,5-bis(3,3-dichloroallylthio)-1,3,4-thiadiazole
3,5-bis(3,3-dichloroallylthio)-1,2,4-thiadiazole
2,5-bis(2,3-dichloroallylthio)-1,3,4-thiadiazole
3,5-bis(2,3-dichloroallylthio)-1,2,4-thiadiazole
2,5-bis(2,3,3 trichloroallylthio)-1,3,4-thiadiazole
3,5-bis(2,3,3-trichloroallylthio)-1,2,4-thiadiazole
2,5-bis(2-bromoallylthio)-1,3,4-thiadiazole
2,5-bis(3-bromoallylthio)-1,3,4-thiadiazole
2,5-bis(3-iodoallylthio)-1,3,4-thiadiazole
2,5-bis(2-fluoro-3-chloroallylthio)-1,3,4-thiadiazole
3,5-bis(3-bromo-2-butenylthio)-1,2,4-thiadiazole
3,5-bis(3-chloro-2-butenylthio)-1,2,4-thiadiazole
3,5-bis(2,3-dichloro-2-butenylthio)-1,2,4-thiadiazole
3,5-bis(2,3-diiodo-2-butenylthio)-1,2,4-thiadiazole and
3,5 - bis(2,3 - dichloro-4-bromobutenylthio)-1,2,4-thiadiazole.

These compounds may be obtained by condensing a thiadiazole with a halide containing the desired haloalkenyl radical. The following detailed examples will further illustrate the invention.

EXAMPLE 1

In a reactor provided with sealed stirrer, thermometer, and reflux condenser was charged 50.1 grams (0.33 mole) of 2,5-dithiol-1,3,4-thiadiazole dissolved in 107 grams (0.67 mole) of 25% sodium hydroxide and 150 grams of water. To this solution was added in one portion 74.5 grams (0.67 mole) of 2,3-dichloropropene. The exothermic reaction caused the temperature to rise from 34° C. to 44° C. in 25 minutes. The mix was cooled by means of a water bath to maintain the temperature below 50° C. As soon as the reaction moderated the water bath was removed and the mix stirred for 4 hours. The product which separated was taken up in 200 ml. of ether and the ether solution washed neutral with water. The solvent was removed in vacuo to a liquid temperature of 100° C./2 mm. The 2,5-bis(2-chloroallylthio)-1,3,4-thiadiazole was a dark amber oil obtained in 77.2% yield. It was soluble in most common organic solvents but insoluble in water.

EXAMPLE 2

In a reactor as described there was charged 75 grams (0.5 mole) of xanthane hydride, 160 grams (1.0 mole) of 25% sodium hydroxide, 440 grams of water and 0.5 gram of a 30% solution of a surface active agent (dodecylbenzene sodium sulfonate). To this solution was added in one portion 111.0 grams (1.0 mole) of 2,3-dichloropropene, causing the temperature to rise from 23° C. to a maximum temperature of 43° C. in 13 minutes. The product was stirred for 5 hours at 50–55° C. and isolated as described in Example 1. The 3,5-bis(2-chloroallylthio)-1,2,4-thiadiazole was an amber oil obtained in 82.8% yield. It was soluble in most common organic solvents but insoluble in water.

EXAMPLE 3

In a reactor provided with sealed stirrer, thermometer, reflux condenser and heating means was charged 25.7 grams (0.171 mole) of xanthane hydride and 54.7 grams (0.342 mole) of 25% sodium hydroxide. To this mixture was added in one portion 49.7 grams (0.342 mole) of 1,1,3-trichloro-1-propene and the mix warmed to 50° C. at which temperature heat was evolved from the reaction causing the temperature to rise to a maximum of 61° C. in 5 minutes. The product was heated for an hour at 60° C., cooled and 100 ml. of water and 100 ml. of chloroform added. The chloroform layer which formed on stirring was given two water washes and the solvent then removed at 100° C./14 mm. 3,5-bis(3,3-dichloroallylthio)-1,2,4-thiadiazole was obtained as a dark amber oil in 71.7% yield. Analysis gave 7.2% nitrogen and 25.3% sulfur as compared to 7.6% nitrogen and 26.1% sulfur calculated for $C_8H_6Cl_4N_2S_3$. It was soluble in most common organic solvents but insoluble in water.

EXAMPLE 4

In a reactor as described there was charged 17.1 grams (0.114 mole) of xanthane hydride, 36.5 grams (0.228 mole) of 25% sodium hydroxide, 50 ml. of water and 5 drops of a 30% solution of a surface active agent (dodecylbenzene sodium sulfonate). To this solution was added in one portion 41.0 grams (0.228 mole) of 1,1,2,3-tetrachloro-1-propene and the mixture heated for 5 hours at 50–55° C. On cooling a heavy oily product layer separated. It wa taken up in 100 ml. of chloroform, washed neutral with water and filtered through clay. The solvent was removed by heating to 100° C./16 mm. 3,5-bis(2,3,3-trichloroallylthio)-1,2,4-thiadiazole was obtained as a dark amber oil in 81.7% yield. It was soluble in most common organic solvents but insoluble in water. Analysis gave 6.6% nitrogen and 22.9% sulfur as compared to 6.4% nitrogen and 22.0% sulfur salculated for $C_8H_4Cl_6N_2S_3$.

EXAMPLE 5

In a reactor as described was charged 37.5 grams (0.25 mole) of xanthane hydride, 80.0 grams (0.5 mole) of 25% sodium hydroxide, 240 grams of water and 0.5 gram of a 30% solution of a surface active agent (dodecylbenzene sodium sulfonate). To this solution was added in one portion 62.5 grams (0.5 mole) of 1,3-dichloro-2-butene, causing the temperature to rise from 26° C. to a maximum temperature of 45° C. in 10 minutes. The product was stirred for 18 hours, the resulting heavy oil taken up in 200 ml. of ether and washed with water until free of chlorides. The solvent was removed by heating to 100° C./12 mm. 3,5-bis(3-chloro-2-butenylthio)-1,2,4-thiadiazole was obtained as a dark red oil in 92.2% yield. It was soluble in most common organic solvents but insoluble in water. Analysis gave 21.4% chlorine as compared to 21.7% calculated for $C_{10}H_{12}Cl_2N_2S_3$.

The new compounds are useful for compounding mineral oil lubricants to increase load carrying capacity and as intermediates. For example, sulfones and sulfoxides result from oxidation with peroxides. Also depending upon the particular isomer and group designated "X" in the general formula, the compounds are useful as defoliants, herbicides, nematocides, insecticides and for inhibiting the deterioration of natural and synthetic rubber due to oxygen or ozone.

Oxygen and ozone resistance of rubber having incorporated therein a small amount of one of the compounds was demonstrated in a base composition comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| N-cyclohexyl-2-benzothiazolesulfenamide | 0.5 |
| Sulfur | 1.0 |
| N,N′-dithiobis morpholine | 1.0 |

Using this base formula stocks were compounded by adding the ingredients as shown in Table I and antioxidant properties evaluated. Samples of the optimum cures of the vulcanizates prepared were artificially aged by heating in a circulating air oven for 72 hours at 100° C. The tensile strengths after aging were determined as well as the tensile strengths of the unaged stocks and the percentage of the original tensile retained after aging was calculated. The data are tabulated in Table I.

*Table I*

| Material added to Base Formula | Parts by Weight | Percent of Unaged Tensile Retained After Aging, Percent |
|---|---|---|
| None | | 21 |
| Product of Example 1 | 1.5 | 36 |
| Product of Example 2 | 1.5 | 26 |

Resistance to exposure cracking was determined by vulcanizing stocks prepared from the above described base formula in the usual manner and determining the resistance of the vulcanizates to cracking by ozone under dynamic conditions in an atmosphere containing a definite concentration of ozone. (The apparatus and procedure employed are described in Analytical Chemistry, vol. 25, page 241, February 1943.) The experimental test specimens were compared visually at various intervals, noting the extent of cracking. A stock which is severely cracked has no service life remaining in terms of the useful life of a rubber article. The results of tests on the following compositions are recorded in Table II.

| Stock | 1 | 2 | 3 |
|---|---|---|---|
| Material added to Base, parts by weight | | | |
| Product of Example 1 | | 1.5 | |
| Product of Example 2 | | | 1.5 |

*Table II*

| Stock | Surface Cracking after Flexing in Ozone for— | | |
|---|---|---|---|
| | 12 Hours | 24 Hours | 36 Hours |
| 1 | none | slight | moderate. |
| 2 | none | v. slight | slight. |
| 3 | none | do | Do. |

The monohaloallylthiothiadiazoles of this invention possess useful insecticidal and defoliant activity. At concentrations of 0.001% they gave 100% kill of the yellow fever mosquito larvae. Applied in the form of a spray containing 0.5% active ingredient 2,5-bis(2-chloroallylthio)-1,3,4-thiadiazole and 3,5-bis(2-chloroallylthio)-1,2,4-thiadiazole defoliated soybeans at a dosage of 9 pounds per acre. The defoliating action was followed by strong phytotoxicity. Thus, after defoliation, regrowth of undesirable vegetation does not occur. The compounds were completely innocuous to all plants pre-emergence at 25 pounds per acre. The halogenated allyl group is required for defoliation. Without halogen no defoliation was observed.

Dissolving or dispersing the haloalkenylthiothiadiazoles in lubricating fractions of petroleum oils increases load carrying capacity. This property was determined in the four-ball extreme pressure tester described in "Engineering," vol. 136, July 13, 1933. The base oil used was a good quality solvent refined Mid-Continent SAE 90 oil. Dosages were chosen to impart 1% sulfur to the oil in each case.

| Additive | Percent Used | Four-Ball Test; Initial Seizure Load (Kg.) |
|---|---|---|
| None | | 70 |
| Product of Example 3 | 4 | >170 |
| Product of Example 4 | 5 | >170 |

It is intended to cover all changes and modifications of the examples of the invention herein chosen for purposes of disclosure which do not constitute departures from the spirit and scope of the invention.

What is claimed is:

1. A thiadiazole of the formula

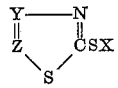

where X is haloalkenyl and Y and Z represent members of the group consisting of N and CSX, one being N and one being CSX, wherein X has the same value given above.

2. A thiadiazole of the formula

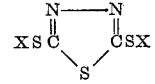

where X is haloallyl.

3. A thiadiazole of the formula

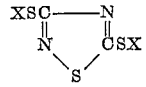

where X is haloallyl.

4. 2,5-bis(2-chloroallylthio)-1,3,4-thiadiazole.
5. 3,5-bis(2-chloroallylthio)-1,2,4-thiadiazole.
6. 3,5-bis(3,3-dichloroallylthio)-1,2,4-thiadiazole.
7. 3,5-bis(2,3,3-trichloroallylthio)-1,2,4-thiadiazole.
8. 3,5-bis(3-chloro-2-butenylthio)-1,2,4-thiadiazole.

References Cited in the file of this patent

UNITED STATES PATENTS

| 2,776,976 | D'Amico | Jan. 8, 1957 |
| 2,776,977 | D'Amico | Jan. 8, 1957 |

OTHER REFERENCES

Richter's "Organic Chemistry," vol. IV, pp. 3–6 (1947).